United States Patent
Tada et al.

(10) Patent No.: US 7,910,638 B2
(45) Date of Patent: Mar. 22, 2011

(54) SEMICONDUCTOR-ENCAPSULATING EPOXY RESIN COMPOSITION, PREPARATION METHOD, AND SEMICONDUCTOR DEVICE

(75) Inventors: Tomoyoshi Tada, Annaka (JP); Shoichi Osada, Annaka (JP); Miyuki Wakao, Annaka (JP); Kazutoshi Tomiyoshi, Annaka (JP); Kenichi Totsuka, Annaka (JP); Tadaharu Ikeda, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 186 days.

(21) Appl. No.: 12/357,764

(22) Filed: Jan. 22, 2009

(65) Prior Publication Data

US 2009/0192258 A1 Jul. 30, 2009

(30) Foreign Application Priority Data

Jan. 25, 2008 (JP) ................................ 2008-014502

(51) Int. Cl.
*C08L 63/00* (2006.01)
*C08K 3/00* (2006.01)
*C08K 3/04* (2006.01)
*C08K 9/00* (2006.01)
*B32B 27/38* (2006.01)

(52) U.S. Cl. ........................................ 523/440; 523/468
(58) Field of Classification Search ........................ None
See application file for complete search history.

(56) References Cited

FOREIGN PATENT DOCUMENTS

| JP | 2001-354837 | 12/2001 |
|----|-------------|---------|
| JP | 2003-337129 | 11/2003 |
| JP | 2004-269636 | 9/2004 |
| JP | 2005-36062 | 2/2005 |
| JP | 2005-112880 | 4/2005 |
| JP | 2006-89670 | 4/2006 |
| JP | 2006-282700 | 10/2006 |
| JP | 2007-186535 | 7/2007 |
| JP | 2008-121010 A * | 5/2008 |

OTHER PUBLICATIONS

Machine translation of JP 2008-121010 A, provided by the JPO website (no date).*
Machine translation of JP 2005-112880 A, provided by the JPO website (no date).*
Machine translation of JP 2005-036062 A, provided by the JPO website (no date).*
Machine translation of JP 2003-337129 A, provided by the JPO website (no date).*
Patent Abstracts of Japan: 2006-282700 A (no date).*
Patent Abstracts of Japan: 2006-089670 A (no date).*
Patent Abstracts of Japan: 2004-269636 A (no date).*
Patent Abstracts of Japan: 2001-354837 A (no date).*

* cited by examiner

*Primary Examiner* — Michael J Feely
(74) *Attorney, Agent, or Firm* — Oblon, Spivak, McClelland, Maier & Neustadt, L.L.P.

(57) ABSTRACT

A semiconductor-encapsulating epoxy resin composition comprising (A) an epoxy resin, (B) a phenolic resin curing agent, (C) an inorganic filler, and (D) carbon black is prepared by mixing a carbon black feedstock and the curing agent with an organic solvent, filtering off coarse particles of carbon black which remain over a mesh sheet with an opening of 20 μm, removing the solvent from the filtrate to yield a premix of curing agent and carbon black, and kneading the premix with the remaining components.

17 Claims, No Drawings

SEMICONDUCTOR-ENCAPSULATING EPOXY RESIN COMPOSITION, PREPARATION METHOD, AND SEMICONDUCTOR DEVICE

CROSS-REFERENCE TO RELATED APPLICATION

This non-provisional application claims priority under 35 U.S.C. §119(a) on Patent Application No. 2008-014502 filed in Japan on Jan. 25, 2008, the entire contents of which are hereby incorporated by reference.

TECHNICAL FIELD

This invention relates to a semiconductor-encapsulating epoxy resin composition which is reliable and effectively moldable and forms a cured product substantially free of electrical failures such as leak failure, when used with fine-pitch interconnection semiconductor devices. More particularly, it relates to a method for preparing such a semiconductor-encapsulating epoxy resin composition, the epoxy resin composition obtained thereby, and a semiconductor device encapsulated with the epoxy resin composition in the cured state.

BACKGROUND ART

As the current semiconductor technology poses a continuous demand for higher density packaging and reductions in size, weight and profile of semiconductor packages, the number of interconnections is increasing. Accordingly, finer pitches are set between aluminum pattern interconnections or gold wires on the chip surface. In particular, the pitch between gold wires, which is more than 100 µm in the past, is now narrowed to 50 µm or less and will reach 30 µm or less. When such a fine pitch interconnection device is encapsulated with an encapsulant, the flowing encapsulant can cause damages to gold wires, often inviting molding defects such as flow, deformation, and breakage of gold wires. In connection with fine pitch interconnection devices, it would be desirable to have a semiconductor-encapsulating composition which prevents gold wires from being flowed or broken during molding and minimizes the occurrence of leak failure between gold wires, and a semiconductor package having such advantages.

With respect to the problem of leak failure, in particular, several approaches are taken to tailor carbon black, including coating carbon black particles with a resin for insulation, dry classification of starting carbon black powder through a sieve to cut off a coarse fraction, and disintegration of coarse particles by pre-milling into finer particles. All these approaches have drawbacks from the standpoints of process efficiency and effective removal of a coarse fraction.

Typical encapsulants used with fine pitch interconnection devices are epoxy resin compositions based on low melt viscosity epoxy resins. When such low viscosity epoxy resin compositions are prepared, it is unlikely that sufficient torques are applied to the mass during kneading, which conditions are deleterious to the dispersion of carbon black. An attempt is also made to use an organic dye to prevent the occurrence of leak failure between gold wires. However, the dye is insufficient in heat resistance and color, failing to overcome the problems.

Known references pertinent to the present invention include JP-A 2006-282700, JP-A 2006-89670, JP-A 2005-112880, JP-A 2005-36062, JP-A 2004-269636, JP-A 2003-337129, and JP-A 2001-354837.

DISCLOSURE OF THE INVENTION

An object of the invention is to provide a semiconductor-encapsulating epoxy resin composition which is effectively moldable, forms a cured product capable of substantially avoiding electrical failures such as gold wire flow and leak failure, when used with fine-pitch interconnection semiconductor devices, and is thus reliable. Specifically, the object is to provide a method for preparing such a semiconductor-encapsulating epoxy resin composition, the epoxy resin composition obtained thereby, and a semiconductor device encapsulated with the epoxy resin composition in the cured state.

The invention relates to a semiconductor-encapsulating epoxy resin composition comprising (A) an epoxy resin, (B) a curing agent, (C) an inorganic filler, and (D) carbon black. The inventor has found that by mixing a carbon black feedstock and part or all of the curing agent with an organic solvent, filtering off coarse particles of carbon black which remain over a mesh sheet with an opening of 20 µm, removing the organic solvent from the filtrate, thus leaving a premix of part or all of the curing agent (B) and carbon black (D), and kneading the premix with the remaining components, there is obtained an epoxy resin composition which is effectively moldable and minimizes electrical failures such as leak failure when used with fine-pitch interconnection semiconductor devices. The semiconductor package encapsulated with the composition is thus fully reliable.

Carbon black is an essential coloring agent in semiconductor-encapsulating epoxy resin compositions. In general, carbon black is available in the form of powder composed of fine primary particles having a submicron size, which also contains coarse products including aggregates (typically primary particles with a size in excess of 20 µm, also known as grits) and secondary particles (typically agglomerates with a size in excess of 20 µm). Even fine particulate carbon black will agglomerate together when it is kneaded with other components to form an epoxy resin composition. If coarse particles of carbon black are captured among gold wires, this carbon black may cause electrical failures such as leak failure between gold wires due to its electrical conductivity.

It would then be desirable to reduce a coarse fraction of carbon black in an epoxy resin composition. The above-mentioned problems can be overcome if carbon black is compounded in an epoxy resin composition as a premix of carbon black and part or all of the curing agent, from which coarse particles of carbon black have been removed by filtration in the above-described way. The method has the advantages that the removal of coarse particles from the carbon black feedstock is highly efficient and that carbon black can be kneaded with other components to form an epoxy resin composition while effectively inhibiting agglomeration of carbon black.

In one aspect, the invention provides a method for preparing a semiconductor-encapsulating epoxy resin composition comprising (A) an epoxy resin having at least two epoxy groups in a molecule, (B) a phenolic resin curing agent having at least two hydroxyl groups in a molecule, (C) an inorganic filler, and (D) carbon black, the method comprising the steps of mixing a carbon black feedstock and part or all of the curing agent with an organic solvent, filtering off coarse particles of carbon black which remain over a mesh sheet with an opening of 20 µm, removing the organic solvent from the filtrate to yield a premix of part or all of the curing agent (B) and carbon black (D), and kneading the premix with the remaining components.

The kneading step is typically at a temperature of 60 to 100° C. Preferably the step of mixing a carbon black feedstock and part or all of the curing agent with an organic solvent uses a pressure mill which may be either a bead mill or a three-roll mill. In a preferred embodiment, the step of mixing a carbon black feedstock and part or all of the curing agent with an organic solvent includes combining the carbon black feedstock, part or all of the curing agent and the organic solvent in a weight ratio of 1-10:9-60:30-90. Also preferably, in the composition, carbon black (D) is present in an amount of 0.1 to 3 parts by weight per 100 parts by weight of components (A) and (B) combined.

In another aspect, the invention provides a semiconductor-encapsulating epoxy resin composition obtained by the method defined above. In a preferred embodiment, the epoxy resin composition is free of coarse particles which are originally present in the carbon black feedstock and remain over a mesh sheet with an opening of 20 μm and is also free of agglomerates which are secondary particles of carbon black and remain over a mesh sheet with an opening of 20 μm.

Also contemplated herein is a semiconductor device encapsulated with the epoxy resin composition in the cured state.

BENEFITS OF THE INVENTION

The method of the invention is successful in preparing a semiconductor-encapsulating epoxy resin composition which is effectively moldable and forms a cured product capable of substantially avoiding electrical failures such as gold wire flow and leak failure, when used with fine-pitch interconnection semiconductor devices. The semiconductor package encapsulated with the composition is thus fully reliable.

DESCRIPTION OF THE PREFERRED EMBODIMENT

The invention is directed to a semiconductor-encapsulating epoxy resin composition comprising (A) an epoxy resin having at least two epoxy groups in a molecule, (B) a phenolic resin curing agent having at least two hydroxyl groups in a molecule, (C) an inorganic filler, and (D) carbon black.

The epoxy resin used herein as component (A) is not particularly limited in molecular structure and molecular weight as long as it has at least two epoxy groups in a molecule. Any epoxy resins can be used herein, including bisphenol type epoxy resins such as bisphenol A epoxy resins and bisphenol F epoxy resins; novolac type epoxy resins such as phenol novolac epoxy resins and cresol novolac epoxy resins; triphenol alkane type epoxy resins such as triphenol methane epoxy resins and triphenol propane epoxy resins; phenol aralkyl type epoxy resins, biphenyl aralkyl type epoxy resins, stilbene type epoxy resins, naphthalene type epoxy resins, biphenyl type epoxy resins, and cyclopentadiene type epoxy resins. These epoxy resins may be used alone or in admixture of two or more.

The curing agent used herein as component (B) is not particularly limited in molecular structure and molecular weight as long as it is a phenolic resin having in a molecule at least two hydroxyl groups (e.g., phenolic hydroxyl groups) reactive with epoxy groups in epoxy resin (A). As the curing agent, any phenolic resins may be used, including novolac type phenolic resins such as phenol novolac resins and cresol novolac resins; xylylene-modified novolac resins such as p-, m- and o-xylylene-modified novolac resins; bisphenol type phenolic resins such as bisphenol A resins and bisphenol F resins; biphenyl type phenolic resins, resole type phenolic resins, phenol aralkyl type resins, biphenylaralkyl type resins, triphenol alkane type resins such as triphenol methane resins and triphenol propane resins, and copolymers thereof. These curing agents may be used alone or in admixture of two or more.

The amount of curing agent (B) compounded is not particularly limited as long as it is used in an effective amount for curing epoxy resin (A). For example, curing agent (B) is preferably used in such amounts that 0.5 to 2.0 moles of phenolic OH groups are available per mole of epoxy groups in epoxy resin (A).

Component (C) is an inorganic filler which is typically selected from crystalline silica, amorphous silica such as spherical or crushed fused silica, alumina, silicon nitride and other fillers exclusive of carbon black. Of these, amorphous silica in spherical or crushed form is preferred because of a low coefficient of linear expansion and high fluidity.

The inorganic filler preferably has an average particle size of the order of 0.1 to 75 μm, more preferably 0.5 to 35 μm, and even more preferably 1 to 20 μm. As used herein, the term "average particle size" is a weight average value or median diameter as determined by the laser light diffraction method.

The inorganic filler as component (C) is preferably compounded in an amount of 250 to 1,000 parts, and more preferably 350 to 900 parts by weight per 100 parts by weight of epoxy resin (A) and curing agent (B) combined. Outside the range, smaller amounts of the inorganic filler may lead to cured compositions which have an increased coefficient of linear expansion or become more moisture absorptive whereas larger amounts may lead to compositions which are less flowable and difficult to mold.

In a preferred embodiment, the inorganic filler is surface treated with coupling agents such as silane coupling agents and titanate coupling agents because of further improvements in moisture absorption, impact resistance and crack resistance. Preferred coupling agents used herein are silane coupling agents including epoxy functional group-containing alkoxysilanes such as γ-glycidoxypropyltrimethoxysilane, γ-glycidoxypropylmethyldiethoxysilane and β-(3,4-epoxycyclohexyl)ethyltrimethoxysilane; amino functional group-containing alkoxysilanes such as N-(β-aminoethyl)-γ-aminopropyltrimethoxysilane, γ-aminopropyltriethoxysilane and N-phenyl-γ-aminopropyltrimethoxysilane; and mercapto functional group-containing alkoxysilanes such as γ-mercaptopropyltrimethoxysilane. The amount of the coupling agent used for surface treatment is not particularly limited although the coupling agent is preferably used in an amount of 0.1 to 1.0% by weight based on the weight of the inorganic filler to be treated therewith. The surface treatment procedure is not particularly limited. For example, the inorganic filler and the coupling agent may be previously mixed whereby the inorganic filler is directly surface treated with the coupling agent. Alternatively, the coupling agent is mixed with the inorganic filler and other components to form a mixture, which is kneaded so that surface treatment may take place during the kneading.

Component (D) is carbon black. Examples of carbon black include acetylene black, furnace black, Ketjen Black, channel black, and lamp black, but are not limited thereto. The shape of carbon black may be spherical, crushed or irregular. These carbon black species may be used alone or in a combination of two or more.

Carbon black as component (D) is preferably compounded in an amount of 0.1 to 3 parts, and more preferably 0.5 to 2.0 parts by weight per 100 parts by weight of epoxy resin (A) and curing agent (B) combined. Outside the range, smaller amounts of carbon black may impart an insufficient color and allow molded parts to be discolored, whereas greater amounts may lead to a loss of flow upon molding.

In addition to the epoxy resin, curing agent, inorganic filler and carbon black as essential components, the epoxy resin composition of the invention may further contain optional components insofar as the objects of the invention are not impaired. Suitable optional components include cure accelerators, for example, organophosphorus compounds such as triphenylphosphine, tributylphosphine, tri(p-methylphenyl) phosphine, triphenylphosphine-triphenylboran, and tetraphenylphosphonium tetraphenylborate; cure accelerators such as triethylamine, benzyldimethylamine, α-methylbenzyldimethylamine, and imidazole compounds such as 1,8-diazabicyclo(5.4.0)undecene-7-phenylimidazole and 2-phenyl-4-methylimidazole; waxes; silane coupling agents; ion trapping agents; stress reducing agents such as silicone polymers and thermoplastic resins; surfactants; and flame retardants such as brominated epoxy resins, antimony compounds, phosphazenes, and metal oxides. These optional components may be used in suitable amounts that do not compromise the benefits of the invention. For example, the cure accelerator is used in an amount of about 0.5 to 10 parts by weight per 100 parts by weight of epoxy resin (A) and curing agent (B) combined.

According to the method of the invention, the semiconductor-encapsulating epoxy resin composition is prepared by first mixing a carbon black feedstock to serve as component (D) later and part or all of the curing agent with an organic solvent to form a liquid mixture having an appropriate viscosity for filtration. The liquid mixture is passed through a mesh sheet with an opening of 20 µm, preferably 10 µm, and more preferably 3 µm, thereby filtering off coarse particles of carbon black (i.e., aggregates and secondary particles or agglomerates contained in the carbon black feedstock) which remain over the mesh sheet with an opening of 20 µm, preferably 10 µm, and more preferably 3 µm. Then the organic solvent is removed from the filtrate, thus yielding a premix of part or all of the curing agent (B) and carbon black (D).

The steps of forming the liquid mixture of carbon black feedstock, curing agent and organic solvent and filtering the liquid mixture (wet filtration) ensure that the coarse particles (i.e., aggregates and agglomerates) contained in the carbon black feedstock are effectively removed. Subsequent removal of the organic solvent leaves the premix in which the carbon black is dispersed in the curing agent. The premix is then combined with the remaining components, and all are kneaded together. Since carbon black is pre-dispersed in the curing agent, the kneading step ensures that the final composition is prepared without forming agglomerates (secondary particles) which are otherwise formed by agglomeration of carbon black in the composition being kneaded, for example, agglomerates which do not pass through a mesh sheet with an opening of 20 µm, preferably 10 µm, and more preferably 3 µm. The inventive method is successful in preparing a semiconductor-encapsulating epoxy resin composition that is free of coarse particles which are originally present in the carbon black feedstock and which remain over a mesh sheet with an opening of 20 µm. The composition is also free of agglomerates which are otherwise formed as secondary particles of carbon black in the composition being kneaded and which remain over a mesh sheet with an opening of 20 µm.

It is preferred from the standpoint of pre-dispersion that the amount of the curing agent in the premix is at least 90 parts by weight per 100 parts by weight of carbon black. The amount of the curing agent is generally up to 6,000 parts by weight though the upper limit is not critical.

Examples of the organic solvent used in premix preparation include methyl ethyl ketone, cyclohexane, cyclohexanone, and butyl acetate. The amount of the organic solvent used is preferably 30 to 90% by weight of the liquid mixture of carbon black feedstock, curing agent and organic solvent.

The premix of curing agent and carbon black is prepared by combining the carbon black feedstock, the curing agent and the organic solvent in a predetermined ratio, and mixing them on a mixer or the like into a fully homogeneous liquid mixture or slurry. The mixture is milled in a pressure mill such as a bead mill or three-roll mill to effect mixing and fine division at the same time. By filtration through a mesh sheet (e.g., woven metal screen) having an opening of a predetermined size, the slurry is separated into an overmesh fraction and a filtrate. The organic solvent is removed from the filtrate, typically by distilling off the organic solvent on a vacuum kneader.

Examples of mixer, mixing/milling equipment, and solvent removing equipment are described above by way of illustration, but not limited thereto. However, the use of a pressure mill in the step of mixing the carbon black feedstock, curing agent and organic solvent is preferred because coarse particles present in the carbon black feedstock can be finely divided to a smaller size than the level that is detrimental upon encapsulation of semiconductor devices so that a maximum percentage of the carbon black feedstock may be utilized.

Preferably removal of the organic solvent is effected at relatively low temperatures, for example, 100° C. to 130° C., and vacuum distillation is thus recommended. In this step, it is accepted that some organic solvent remains in the premix after removal of the organic solvent as long as the residual amount does not impact the properties of the epoxy resin composition.

In the step of combining (or mixing) the carbon black feedstock and part or all of the curing agent with the organic solvent, preferably the carbon black feedstock, part or all of the curing agent and the organic solvent are combined in a weight ratio of 1-10:9-60:30-90. If the ratio of the carbon black feedstock is too low, the epoxy resin composition may have a larger proportion of the curing agent, making it difficult to adjust the proportion of respective components in the composition. Inversely, if the ratio of the carbon black feedstock is too high, the mixture of carbon black, curing agent and organic solvent may have a viscosity increased to interfere with adequate mixing and filtration. If the ratio of the organic solvent is too low, the mixture may also have an increased viscosity. If the ratio of the organic solvent is too high, the solvent removal step may take a longer time.

The method of the invention involves the final step of kneading the premix with the remaining components, thus yielding the desired epoxy resin composition for semiconductor encapsulation. One typical procedure taken at this stage is by combining the premix with epoxy resin (A), the remainder of curing agent (B), inorganic filler (C), and optional components such as a cure accelerator in a predetermined ratio, mixing them on a mixer or the like into a homogeneous mixture, then melt mixing (or kneading) on a hot roll mill, kneader or extruder, preferably at a temperature of 60 to 100° C. The kneaded mass is then cooled for solidification and ground into a molding material of a suitable size (i.e., semiconductor-encapsulating epoxy resin composition).

The method of preparing an epoxy resin composition according to the invention is advantageous particularly when it is desired to prepare compositions which have so low a melt viscosity that they are little torqued during kneading. The method is most effective in preparing those compositions which are expected to undergo little disintegration of carbon black during kneading, typically those compositions having a melt viscosity equal to or less than 10 Pa·s at 175° C.

The molding material thus obtained may be used in encapsulation and packaging of semiconductor devices. Use of this molding material offers reliable packages with excellent characteristics.

A semiconductor device is readily fabricated by encapsulating a semiconductor member with the epoxy resin composition in the cured state. Examples of the semiconductor member to be encapsulated include integrated circuit boards, transistors, thyristors, and diodes. Best results are obtained when the composition is used with fine-pitch interconnection semiconductor devices.

While the semiconductor-encapsulating epoxy resin composition prepared by the inventive method is advantageously used in encapsulation of various semiconductor members, one typical encapsulation technique is low pressure transfer molding. The composition is preferably molded at a temperature of 160 to 185° C. for 30 to 180 seconds, desirably 40 to 90 seconds, and post-cured at or above 150° C.

EXAMPLE

Examples of the invention are given below by way of illustration and not by way of limitation.

Preparation Examples 1 and 2

Preparation of Premix by Mixing Carbon Black and Curing Agent with Organic Solvent, Filtering Off Coarse Particles, and Removing Organic Solvent A carbon black feedstock, curing agent and solvent were weighed in accordance with the formulation shown in Table 1, admitted into a 20-L vessel, and mixed for 8 hours using a mixer of Satake Chemical Equipment Mfg., Ltd. The resulting slurry was mixed and milled on a Dyno-Mill KDL-A (Shinmaru Enterprise Corp.) filled with beads of 0.3 mm diameter. The slurry was then filtered by means of a pressure filtration system (Advantec MFS, Inc., filtration mesh sheet with an opening of 3 μm). Using a planetary mixer model PLM-5 (Inoue Mfg. Co., Ltd.), the organic solvent (cyclohexanone) was removed. Since coarse particles which were originally in the carbon black feedstock and remained over the mesh sheet with an opening of 3 μm were filtered off, the above process left a carbon black/curing agent premix. The amount of premix was 30 and 50 parts by weight in Preparation Examples 1 and 2, respectively. They are designated Premix 1 in Preparation Example 1 and Premix 2 in Preparation Example 2.

Comparative Preparation Examples 1 and 2

Preparation of Mixture by Mixing Carbon Black and Curing Agent on Pressure Kneader A carbon black feedstock and curing agent were weighed in accordance with the formulation shown in Table 1 and mixed on a 5-L pressure kneader at 100° C. for 10 minutes. The mixture was taken out, cooled, and ground to a suitable size. The products are designated Comparative Mix 1 in Comparative Preparation Example 1 and Comparative Mix 2 in Comparative Preparation Example 2.

Premixes 1 and 2 in Preparation Examples 1 and 2 and Comparative Mixes 1 and 2 in Comparative Preparation Examples 1 and 2 were examined by a particle gauge test.

Particle Gauge Test

Using a grind meter (groove 0-100 μm) according to JIS K-5101, a scale mark at which a groove was observable with 1 g of a sample was read out. The sample used herein was prepared by dissolving the mixture in a solvent in a predetermined concentration. For Premix 1 and Comparative Mix 1, samples contained 70% by weight of cyclohexanone. For Premix 2 and Comparative Mix 2, samples contained 50% by weight of cyclohexanone.

TABLE 1

|  | Preparation Example 1 | Preparation Example 2 | Comparative Preparation Example 1 | Comparative Preparation Example 2 |
|---|---|---|---|---|
| Carbon black A (pbw) | 3 |  | 3 |  |
| Carbon black B (pbw) |  | 5 |  | 5 |
| Curing agent (pbw) | 27 | 45 | 27 | 45 |
| Cyclohexanone (pbw) | 70 | 50 |  |  |
| Particle gauge test | line seen near 10 μm | line seen near 10 μm | line seen near 50 μm | line seen near 90 μm |

Carbon black A: Denka Black, powder form (Denki Kagaku K.K.)
Carbon black B: Denka Black, granular form (Denki Kagaku K.K.)
Curing agent: MEH-7800SS (Meiwa Chemical Co., Ltd., phenol aralkyl resin, phenolic hydroxyl equivalent 175)

Examples 1 to 3 and Comparative Examples 1 to 4

Components as shown in Table 2 were melt mixed on a hot two-roll mill at 100° C. until uniform, cooled and ground, obtaining molding materials (epoxy resin compositions). The molding materials were worked into tablets and evaluated by the following tests. The test results are shown in Table 2.

Spiral Flow

A spiral flow was measured by using a mold according to EMMI standards and molding at a temperature of 175° C. and a pressure of 70 kgf/cm$^2$ for a molding time of 90 seconds.

Melt Viscosity

A minimum melt viscosity was measured at a temperature of 175° C. under a load of 10 kgf, using an extrusion plastometer (Shimadzu Mfg. Co., Ltd.) and a die of 1 mm diameter and 10 mm length.

Leak Failure

On a flat package of 20×20×1 mm having a chip of 10×10×0.35 mm mounted thereon, gold wires having a diameter of 20 μm and a length of 5 mm were bonded at a spacing of 50 μm. The molding material was molded over the package at 175° C. and 70 kgf/cm$^2$ for 120 seconds and post-cured at 180° C. for 4 hours. The package was held in a thermostat chamber at 85° C. and 85% RH for 72 hours for moisture absorption, after which the current flow between gold wires was measured. Samples marking a current value of 10 microampere (μA) or more are rejected.

Coarse Particles of Carbon Black in Composition

A 500-ml glass vessel was charged with 100 g of the epoxy resin composition and 200 g of acetone, which were agitated at 25° C. for 1 hour to dissolve the resin value. The solution was filtered through a woven metal screen with an opening of 20 μm. The residue on filter was dried at 100° C. for 30 minutes and rested on a filter paper, type 5-C for chemical analysis (JIS P-3801). The filter paper was placed on a platinum dish and exposed to a 50% hydrogen fluoride vapor whereby the filler in the filtrate residue was dissolved. With the residual matter placed on a glass plate, the number of carbon black particles was counted under a stereoscopic microscope.

TABLE 2

|  | Example | | | Comparative Example | | | |
| --- | --- | --- | --- | --- | --- | --- | --- |
|  | 1 | 2 | 3 | 1 | 2 | 3 | 4 |
| Epoxy resin 1 (pbw) | 52 | 52 |  | 52 | 52 | 52 |  |
| Epoxy resin 2 (pbw) |  |  | 61 |  |  |  | 61 |
| Curing agent (pbw) | 30 | 30 | 21 | 48 | 30 | 30 | 39 |
| Silica (pbw) | 900 | 900 | 800 | 900 | 900 | 900 | 800 |
| Silane coupling agent (pbw) | 0.5 | 0.5 | 1 | 0.5 | 0.5 | 0.5 | 1 |
| Triphenylphosphine (pbw) | 2 | 2 | 1.5 | 2 | 2 | 2 | 1.5 |
| Carbon black (pbw) |  |  |  | 2 |  |  | 2 |
| Premix 1 (pbw) | 20 |  | 20 |  |  |  |  |
| Premix 2 (pbw) |  | 20 |  |  |  |  |  |
| Comparative Mix 1 (pbw) |  |  |  |  | 20 |  |  |
| Comparative Mix 2 (pbw) |  |  |  |  |  | 20 |  |
| Spiral flow (cm) | 120 | 118 | 100 | 125 | 105 | 108 | 103 |
| Melt viscosity (Pa-s) | 8 | 8 | 10 | 7 | 10 | 10 | 11 |
| Leak failure (rejected samples/test samples) | 0/30 | 0/30 | 0/30 | 7/30 | 1/30 | 5/30 | 6/30 |
| Number of carbon black coarse particles in composition | 0 | 0 | 0 | 35 | 28 | 40 | 23 |

Epoxy resin 1: YX-4000K (Japan Epoxy Resin Co., Ltd., epoxy equivalent 190)
Epoxy resin 2: NC-3000 (Nippon Kayaku Co., Ltd., epoxy equivalent 272)
Curing agent: MEH-7800SS (Meiwa Chemical Co., Ltd., phenol aralkyl resin, phenolic hydroxyl equivalent 175)
Silica: spherical fused silica having an average particle size 10 μm and containing 0.1 wt % of coarse particles with a size in excess of 75 μm
Silane coupling agent: KBM-573 (Shin-Etsu Chemical Co., Ltd., N-phenyl-3-aminopropyltrimethoxysilane)
Carbon black: Denka Black, powder form (Denki Kagaku K.K.)
Premix 1, 2: obtained in Preparation Examples 1 and 2
Comparative Mix 1, 2: obtained in Comparative Preparation Examples 1 and 2

As seen from Table 2, the compositions which are formulated from the premixes obtained by previously mixing carbon black, curing agent and organic solvent, filtering off coarse particles of carbon black, and removing the organic solvent are free of coarse particles of carbon black. The cured compositions do not cause leak failure.

Japanese Patent Application No. 2008-014502 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a semiconductor-encapsulating epoxy resin composition comprising (A) an epoxy resin having at least two epoxy groups in a molecule, (B) a phenolic resin curing agent having at least two hydroxyl groups in a molecule, (C) an inorganic filler, and (D) carbon black, said method comprising:
   mixing a carbon black feedstock and part or all of the curing agent with an organic solvent,
   filtering off coarse particles of carbon black which remain over a mesh sheet with an opening of 20 μm, 10 μm or 3 μm,
   removing the organic solvent from the filtrate to yield a premix of part or all of the curing agent (B) and carbon black (D), and
   kneading the premix with the remaining components.

2. The method of claim 1 wherein the kneading is at a temperature of 60 to 100° C.

3. The method of claim 1 wherein the mixing a carbon black feedstock and part or all of the curing agent (B) with an organic solvent is carried out in a pressure mill.

4. The method of claim 3 wherein the pressure mill is a bead mill or three-roll mill.

5. The method of claim 1 wherein the mixing a carbon black feedstock and part or all of the curing agent (B) with an organic solvent comprises combining the carbon black feedstock, part or all of the curing agent and the organic solvent in a weight ratio of 1-10:9-60:30-90, and in the composition, carbon black (D) is present in an amount of 0.1 to 3 parts by weight per 100 parts by weight of components (A) and (B) combined.

6. The method of claim 1, wherein the epoxy resin is at least one selected from the group consisting of a bisphenol epoxy resin, a novolac epoxy resin, a triphenol alkane epoxy resin, a phenol aralkyl epoxy resin, a biphenyl aralkyl epoxy resin, a stilbene epoxy resin, a naphthalene epoxy resin, a biphenyl epoxy resin, and a cyclopentadiene epoxy resin.

7. The method of claim 1, wherein the curing agent (B) is at least one selected from the group consisting of a novolac phenolic resin, a xylylene-modified novolac resin, a bisphenol phenolic resin, a biphenyl phenolic resin, a resole phenolic resin, a phenol aralkyl resin, a biphenylaralkyl resin, a triphenol alkane resin, and copolymers thereof.

8. The method of claim 1, wherein the curing agent (B) is present in such an amount that 0.5 to 2.0 moles of phenolic OH groups are available per mole of epoxy groups in epoxy resin (A).

9. The method of claim 1, wherein the inorganic filler (C) is selected from the group consisting of crystalline silica, amorphous silica, alumina, and silicon nitride.

10. The method of claim 1, wherein the inorganic filler (C) has an average particle size of the order of 0.1 to 75 μM, as determined by the laser light diffraction.

11. The method of claim 1, wherein the inorganic filler (C) is compounded in an amount of 250 to 1,000 parts by weight per 100 parts by weight of epoxy resin (A) and curing agent (B) combined.

12. The method of claim 1, wherein the inorganic filler (C) inorganic filler is surface treated with a coupling agent.

13. The method of claim 1, wherein the carbon black (D) is at least one selected from the group consisting of acetylene black, furnace black, Ketjen Black, channel black, and lamp black.

14. The method of claim 1, wherein the opening of the mesh sheet is 10 μm.

15. The method of claim 1, wherein the opening of the mesh sheet is 3 μm.

16. The method of claim 1, wherein the removing the organic solvent is effected at 100° C. to 130° C.

17. The method of claim 1, wherein the kneading is carried out in the presence of a cure accelerator.

* * * * *